United States Patent [19]
Naimpally et al.

[11] Patent Number: 5,874,995
[45] Date of Patent: Feb. 23, 1999

[54] MPEG VIDEO DECODER HAVING A HIGH BANDWIDTH MEMORY FOR USE IN DECODING INTERLACED AND PROGRESSIVE SIGNALS

[75] Inventors: Saiprasad V. Naimpally, Langhorne, Pa.; Shuji Inoue, Mount Holly, N.J.

[73] Assignee: Matsuhita Electric Corporation of America, Secaucus, N.J.

[21] Appl. No.: 923,549

[22] Filed: Sep. 2, 1997

Related U.S. Application Data

[63] Continuation of Ser. No. 344,221, Nov. 23, 1994, abandoned, which is a continuation-in-part of Ser. No. 330,579, Oct. 28, 1994, Pat. No. 5,623,311.

[51] Int. Cl.⁶ .............................. H04N 7/12; H04N 11/02
[52] U.S. Cl. ......................... 348/384; 348/719; 348/715; 348/416; 348/415; 348/845.2; 348/845.3; 348/411
[58] Field of Search ..................... 348/717, 715, 348/718, 719, 415, 416, 405, 384, 423, 464, 419, 411, 412, 854.1–3

[56] References Cited

U.S. PATENT DOCUMENTS

| | | | |
|---|---|---|---|
| 4,698,674 | 10/1987 | Bloom | 348/451 |
| 4,758,881 | 7/1988 | Laspada | 358/21 |
| 4,766,431 | 8/1988 | Kobayashi et al. | |
| 4,825,287 | 4/1989 | Baji et al. | 358/160 |
| 5,136,662 | 8/1992 | Maruyama et al. | 382/49 |
| 5,239,628 | 8/1993 | Hasebe et al. | 348/384 |
| 5,253,041 | 10/1993 | Wine et al. | 348/412 |
| 5,298,997 | 3/1994 | Manabe | 348/452 |
| 5,329,365 | 7/1994 | Uz | 348/409 |
| 5,369,444 | 11/1994 | Ersoz et al. | 348/450 |
| 5,373,323 | 12/1994 | Kwon | 348/452 |
| 5,379,351 | 1/1995 | Fandrianto et al. | 348/384 |
| 5,379,356 | 1/1995 | Purcell | 348/717 |
| 5,386,237 | 1/1995 | Knee | 348/450 |
| 5,398,072 | 3/1995 | Auld | 348/426 |
| 5,442,402 | 8/1995 | Sohn et al. | 348/416 |
| 5,479,212 | 12/1995 | Kurobe et al. | 348/409 |
| 5,548,709 | 8/1996 | Hannah et al. | 395/164 |
| 5,557,538 | 9/1996 | Retter et al. | 348/407 |
| 5,576,765 | 11/1996 | Cheney et al. | 348/407 |
| 5,579,052 | 11/1996 | Artieri | 348/416 |
| 5,614,952 | 3/1997 | Boyce et al. | 348/392 |
| 5,623,314 | 4/1997 | Retter et al. | 348/423 |
| 5,675,387 | 10/1997 | Hoogenboom et al. | 348/416 |

FOREIGN PATENT DOCUMENTS

| | | |
|---|---|---|
| 0503956A2 | 5/1992 | European Pat. Off. |
| 0591695A1 | 4/1994 | European Pat. Off. |

OTHER PUBLICATIONS

M. Farmwald et al. "A Fast Path to One Memory", *IEEE Spectrum*, Oct. 1992, No. 10, New York European Search Report, Jun. 1998.

"Advanced Information", *RDRAM Reference Manual*, pp. 3–7 & 12.

"IBM MPEG–2 Decoder Chip User's Guide", *IBM*, Second Edition (Jun. 1994).

"MPEG–2/CCIR 601 Video Decoder", *SGS–Thomson Microelectronics*, pp. 1–84 (Jul. 1994).

*Primary Examiner*—Tommy P. Chin
*Attorney, Agent, or Firm*—Ratner & Prestla

[57] ABSTRACT

A decoder for a video signal encoded according to the MPEG-2 standard processes either interlace scan signals or progressive scan signals by dynamically reconfiguring a single high-bandwidth memory. The memory is used to hold 1) the input bit-stream, 2) first and second reference frames used for motion compensated processing, and 3) image data representing a field that is currently being decoded. The decoder includes circuitry which stores and fetches the bit-stream data, fetches the reference frame data, stores the image data for the field that is currently being decoded in block format and fetches this image data for conversion to raster-scan format. This circuitry also detects whether the signal is in interlace or progressive format from the input data stream. When an interlace format signal is being decoded, the memory is partitioned in one configuration and when a progressive format signal is being decoded, the memory is partitioned in another configuration.

12 Claims, 8 Drawing Sheets

MPEG VIDEO DECODER HAVING A HIGH BANDWIDTH MEMORY FOR USE IN DECODING INTERLACED AND PROGRESSIVE SIGNALS

This application is a continuation of application Ser. No. 08/344,221 filed Nov. 23, 1994, now abandoned, which is a continuation-in-part of Ser. No. 08/330,579 filed Oct. 28, 1994, now U.S. Pat. No. 5,623,311.

FIELD OF THE INVENTION

The present invention relates to decoding of digitally encoded video signals and in particular to a decoder which dynamically reconfigures a high-bandwidth memory to decode video signals that have been encoded according to the MPEG-2 standard in interlace or progressive format.

BACKGROUND OF THE INVENTION

In the United States a standard has been proposed for digitally encoded high definition television signals. This standard is essentially the same as the MPEG-2 standard, proposed by the Moving Picture Experts Group (MPEG) of the International Organization for Standardization (ISO). This standard is described in a draft internal standard (DIS) publication entitled "Information Technology—Generic Coding of Moving Pictures and Associated Audio, Recommendation H.262" ISO/IEC 13818-2 DIS, March 1994 which is available from the ISO and which is hereby incorporated by reference for its teaching on the MPEG-2 digital video coding standard.

The MPEG-2 standard is actually many different standards. In MPEG-2 several profiles are defined, each corresponding to a different level of complexity of the encoded image. For each profile, different levels are defined, each level corresponding to a different image resolution. One of the MPEG-2 standards, known as Main Profile, Main Level (MP@ML) is intended for coding video signals conforming to existing television standards (i.e., NTSC and PAL). This standard may be used to encode video images having 480 active lines each with 720 active pixels with a 2:1 interlace scan. When the horizontal and vertical blanking intervals are added to these signals, the result has 525 lines by 858 pixels. When they are decoded, and displayed with a 13.5 MHz display clock signal, these signals produce images that correspond to NTSC-type broadcast images.

Another standard, known as Main Profile, High Level (MP@HL) is intended for coding high-definition television images. Images encoded according to the Main Profile, High Level standard may have as many as 1,152 active lines per image frame and 1,920 active pixels per line. The number of pixels per line and the number of lines per frame are variable. In addition, the Main Profile, High Level signal may be scanned either progressively or using an interlaced format.

The Main Profile, Main Level standard, on the other hand, defines a maximum picture size of 720 pixels per line and 567 lines per frame. At a frame rate of 30 frames per second, signals encoded according to this standard have a data rate of 10,368,000 pixels per second. By contrast, images encoded according to the Main Profile, High Level standard have a maximum data rate of 1,152 * 1,920 * 30 or 62,668,800 pixels per second (the maximum data rate numbers may be found in the MPEG-2 specification at table 8–11). The data rate of the high definition television signals is more than five times the data rate of image data encoded according to the Main Profile Main Level standard. The standard proposed for HDTV encoding in the United States is a subset of this standard, having as many as 1,080 lines per frame, 1,920 pixels per line and a maximum frame rate, for this frame size, of 30 frames per second. The maximum data rate for this proposed standard is still far greater than the maximum data rate for the Main Profile, Main Level standard.

The MPEG-2 syntax defines several layers of data records which are used to convey both audio and video data. For the sake of simplicity, the decoding of the audio data is not described herein. Encoded data which describes a particular video sequence is represented in several nested layers, the Sequence layer, the Group of Pictures layer, the Picture layer, the Slice layer and the Macroblock layer. To aid in transmitting this information, a digital data stream representing multiple video sequences is divided into several smaller units and each of these units is encapsulated into a respective packetized elementary stream (PES) packet. For transmission, each PES packet is divided, in turn, among a plurality of fixed-length transport packets. Each transport packet contains data relating to only one PES packet. The transport packet also includes a header which holds control information to be used in decoding the transport packet.

When an MPEG-2 encoded image is received, a transport decoder (not shown) decodes the transport packets to reassemble the PES packets. The PES packets, in turn, are decoded to reassemble the MPEG-2 bit-stream which represents the image in the layered records, as described above. A given transport data stream may simultaneously convey multiple image sequences, for example as interleaved transport packets. This flexibility also allows the transmitter to switch among formats providing material in 4 by 3 aspect ratio according to one standard and widescreen (16 by 9) material according to another standard.

Because of the wide range of data rates for these different standards, a decoder which can handle all of the video standards defined for MPEG-2 needs a large, high-bandwidth memory or several distributed smaller memories which, when considered together, are at least as large as the single memory. These memories unduly increase the cost of a commercial television receiver. This memory is used to hold the input bit-stream as it is received, to hold two anchor frames of data which are used to decode predictively (P-frame) and bidirectionally predictively (B-frame) encoded data, to hold the frame which is being decoded and to hold data which is being converted from the block-format used for encoding and decoding the image data to a raster-scan format that is used to display the data.

SUMMARY OF THE INVENTION

The present invention is embodied in a decoder suitable for decoding a video signals which have been encoded for display in an interlaced format and in a progressive format. The decoder employs a single high-bandwidth memory to hold the input data as it is received, to store the images used to decode predictively encoded data and to convert the decoded images from block format to raster format. The system includes circuitry which detects whether the signal being received is to be displayed in interlace format or progressive format and produces an indication signal. The system also includes circuitry which configures the memory to allocate data areas suitable for decoding signals in either the progressive format or the interlaced format, responsive to the indication signal.

According to one aspect of the invention, when the signal is to be decoded to produce a progressive display, the configuration circuitry increases the amount of memory used to hold the input data and decreases the amount of memory used to convert the image from block format to raster format. When the signal is to be decoded to produce an interlace display, however, the configuration circuitry decreases the amount of memory used to hold the input data and increases the amount of data used to convert the image from block format to raster format.

DETAILED DESCRIPTION

While the invention is described in terms of a decoder for image data which has been encoded using either the MPEG-2 Main Profile, High Level or Main Profile Main Level standard, it is contemplated that it may be used to decode other types of encoded video information.

OVERVIEW

The decoder described below is able to decode video data which has been encoded according to two MPEG-2 standards. The first standard is Main Profile, High Level but at a much lower resolution than is usually used for this standard. In the encoding technique that is used, the reproduced images are displayed in a progressive scan format as 480 active lines per frame (525 total lines) each line having 720 active pixels, with a frame rate of 59.94 frames per second. This standard is designated in the materials that follow as 525P. The second standard is the Main Profile, Main Level. Using this technique, the reproduced images are displayed with the same number of samples per line and lines per frame but with a 2:1 interlaced scan so that the frame rate is 29.97 frames per second (59.94 fields per second). This second standard is designated in the materials that follow as 525I. Each of these signals may be displayed either in a 4 by 3 aspect ratio or a 16 by 9 aspect ratio.

Figure 1A:
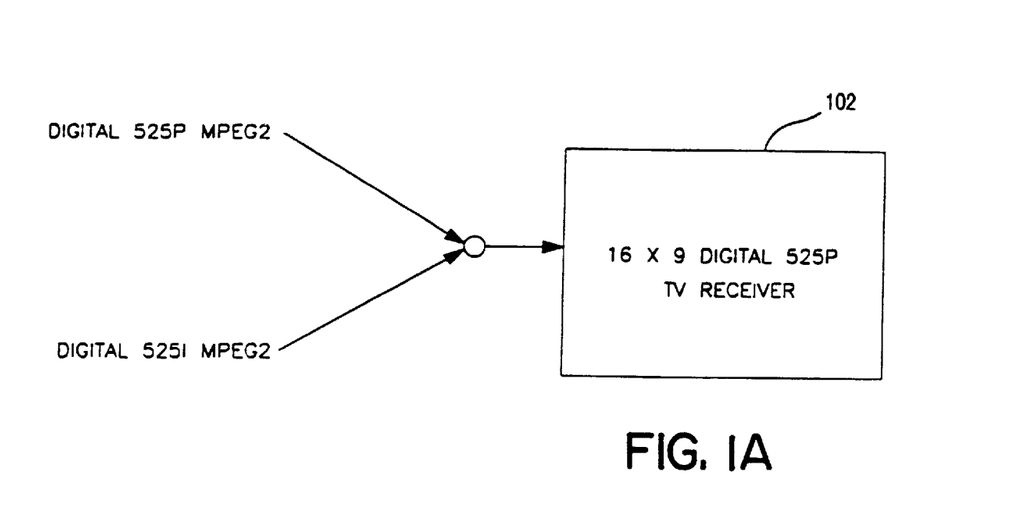
FIGS. 1a and 1b are block diagrams of television receiving systems which include a video decoder according to the present invention.
Figure 1B:
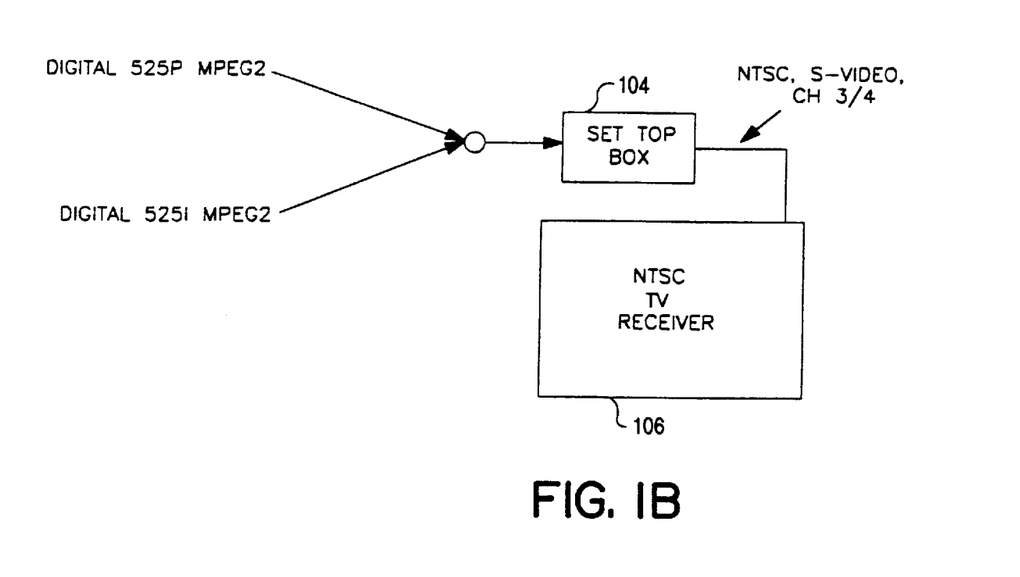

FIGS. 1a and 1b show two basic configurations which are contemplated for the subject invention. The first configuration includes a television receiver 102 that contains a decoder according to the present invention. The receiver 102 receives either 525P or 525I signals and converts these signals into an image which is displayed with an aspect ratio of either 16 by 9 or 4 by 3, depending on the aspect ratio defined by the encoded 525I or 525P signal. To produce the interlace display, the display device used in the receiver 102 may be a multi-sync type display which automatically adapts to different synchronization signals generated from the 525I and 525P signals. Alternatively, the display device may only be synchronized to signals at the progressive scan rate. In this instance, interlaced signals may be displayed, for example, by blanking every alternate line, repeating each line twice or filling the interstitial lines with a signal level that represents an average brightness over the image field or over a predetermined portion of the field.

The second configuration, shown in FIG. 1b, employs a decoder according to the present invention in an external set-top box 104 to decode a signal in either 525I or 525P for display on a conventional 4 by 3 television receiver 106. In this instance, when a 525P signal is decoded, the block to raster conversion process only displays alternate lines of each of the progressive scan frames so that the image may be displayed in interlace format. As shown in FIG. 1b, the signals provided by the set-top box 104 may be in the form of baseband NTSC composite video, S-Video (separate luminance and chrominance) or modulated NTSC video signals transmitted as either a channel 3 or channel 4 signal, as is common with video cassette recorders and video games. The set-top box 104 also makes use of the Pan-Scan feature of the MPEG-2 syntax, as described in section 6.3.12.1 of the above-referenced Draft International Standard. When a 525I or 525P signal representing an image having a 16 by 9 aspect ratio is received, this feature indicates which 4 by 3 portion of the image is the most interesting. Responsive to this signal, only that 4 by 3 portion of the image is displayed.

A video decoder according to the present invention employs a single high bandwidth memory and several distributed buffer memories along with suitable processing circuitry in order to decode a MPEG-2 encoded video signal. The single memory is used to hold 1) the encoded bit stream, 2) prediction image data from a prior frame and a subsequent frame and 3) image data which is being converted from block format to raster-scan format for display. Because image data is received at a much greater rate for the 525P signal, more of the memory is used to hold the encoded bit stream when a 525P signal is received than when a 525I signal is received. Conversely, it is more difficult to convert an interlaced signal from block format to raster format so more of the memory is used for block-to-raster conversion when the 525I signal is received than when the 525P signal is received.

Figure 2:
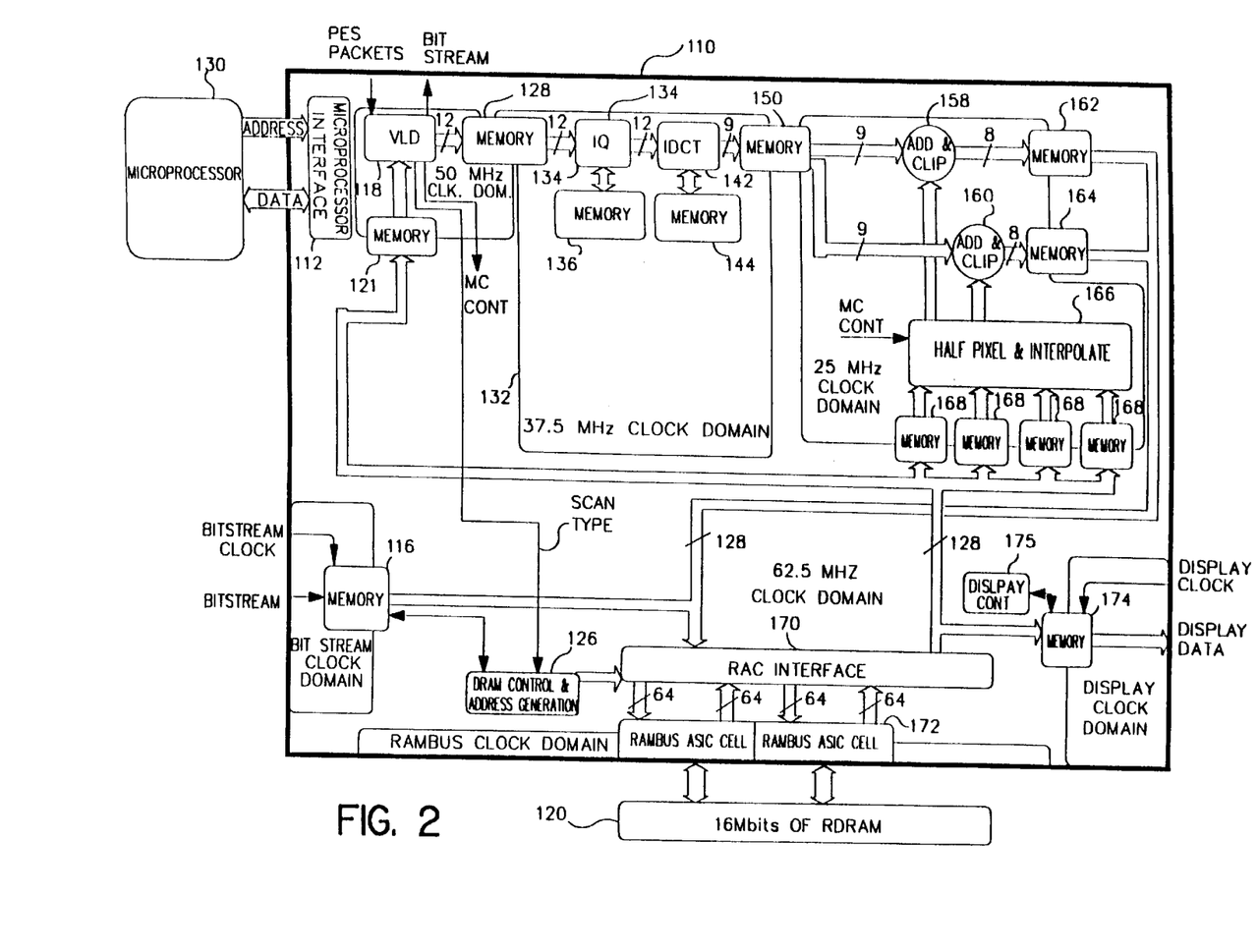
FIG. 2 is a block diagram of a video decoder suitable for use in either of the systems shown in FIGS. 1a and 1b.

FIG. 2 is a block diagram of an exemplary decoder system which embodies the present invention. This system includes three components, a decoding processor 110 a high-bandwidth memory 120 and a control microprocessor 130. The high-bandwidth memory 120 used in the exemplary embodiment of the invention is a RAMBUS memory system which is available from NEC and Toshiba. The structure of this memory is described below with reference to FIG. 4.

Briefly, the decoder shown in FIG. 2 operates as follows. As a first step, the decoder integrated circuit (IC) 110 is initialized by the microprocessor 130 in a particular configuration. If, for example, the decoder is to be used to decode 525P signals, the appropriate control values are applied to the internal circuitry of the decoding processor 110 via the microprocessor interface 112. For the sake of clarity, the control bus between the microprocessor 130 and each of the elements in the IC 110 has been omitted.

Once the IC 110 has been initialized, the input bit-stream is applied to the memory 116, synchronous with the bit-stream clock. The bitstream clock is derived by the transport decoder which converts the transport packets into PES packets. The PES packets, in turn, are converted into a video bit-stream by the VLD 118, as described in more detail below with reference to FIG. 3. The bitstream data is then stored into a buffer memory 116. The DRAM control and address generator 126, monitors the fullness of the memory 116 and determines a location in the memory 120 at which the input bit-stream is to be stored. In the exemplary embodiment of the invention, a portion of the memory 120 is reserved for use as a buffer to hold the input bit-stream. This buffer area corresponds to the VBV buffer which is specified in the MPEG-2 standard to hold bit-stream data before it is decoded. The controller 126 also monitors a signal SCAN TYPE provided by the VLD processor 118 to place the memory in proper configuration for decoding signals in interlace format or progressive format. The generation and use of this signal is described below.

According to the standard, before decoding may begin, the VBV buffer must hold an amount of data specified in a field of the Sequence header of the bit stream. This constraint ensures that there is a steady supply of data to the decoder.

After the bit-stream data is written into the VBV buffer area of memory 120, it is read from the memory 120 and stored in the buffer memory 121, also under control of the DRAM control and address generation circuitry 126. The memory 121 is a FIFO memory which is filled in bursts from the memory 120 and emptied by the variable length decoder (VLD) 118 as dictated by the bit-stream syntax. The structure and operation of the VLD 118 is described below with reference to FIG. 3.

The VLD 118 decodes the data stream to generate blocks of quantized discrete cosine transform coefficient values. These blocks of values are applied a FIFO memory 128. This FIFO memory buffers the data between the VLD 118 on the one hand and the circuitry 132 on the other hand. These memories also perform the inverse scan function defined in the MPEG-2 standard. The circuitry 132 performs inverse quantization and inverse discrete cosine transform (IDCT) operations on the data provided by the VLD 118. The output data provided by the circuitry 132 are blocks of pixel values or differential pixel values. Where the values in the blocks are differential pixel values, they are combined with values from previously decoded image frames by the add and clip circuitry 158 and 160. These circuits, in turn, obtain the image data from the previously decoded frames, which are provided by the half pixel and interpolation circuitry 166. The interpolation circuitry 166 obtains the image pixels from the previously decoded frames using buffer memories 168. Data values for these memories are provided from the memory 120 by the DRAM control and address generation circuitry 126.

In addition, the VLD 118 includes a digital phase locked loop (DPLL) which is used to synchronize the system to the 27 MHz clock signal that is defined for the MPEG bit-stream. This circuitry is described below with reference to FIG. 3.

The decoded image data produced by the add and clip circuitry 158 and 160 is stored into buffer memories 162 and 164. From the buffer memories 162 and 164 the decoded image data is stored into the memory 120 for display or for use as reference frame data in decoding motion compensated encoded data from later received image fields or frames. Data to be displayed is stored into the memory 120 in block format and transferred to a memory 174 to be provided to a display device (not shown) in raster scan format.

DETAILED DESCRIPTION OF THE EXEMPLARY EMBODIMENTS

FIG. 2 is a block diagram of an exemplary HDTV decoding system, which may be used to decode high definition television signals that have been encoded according to the MPEG-2 standard. The system shown in FIG. 2 does not address some aspects of the high definition television decoding standard, namely the demodulation of the received signals to recover the digital data stream, the decoding of the transport layer and the processing of the signals provided by the system for display. The circuit 110, shown in FIG. 2 is an MPEG-2 video decoder. It is provided with data values derived from the transport layer as described below.

This decoder, includes a decoding path containing a VLD 118, an inverse quantization processor 134 and an inverse discrete cosine transform (IDCT) processor 142. The data stream produced by this decoding path are processed by motion compensation processing circuitry 158, 160 and 166 to produce a single, time multiplexed stream of blocks of decoded pixels. The two decoding paths read data from, and write data to the memory 120 at several locations.

Figure 3A:
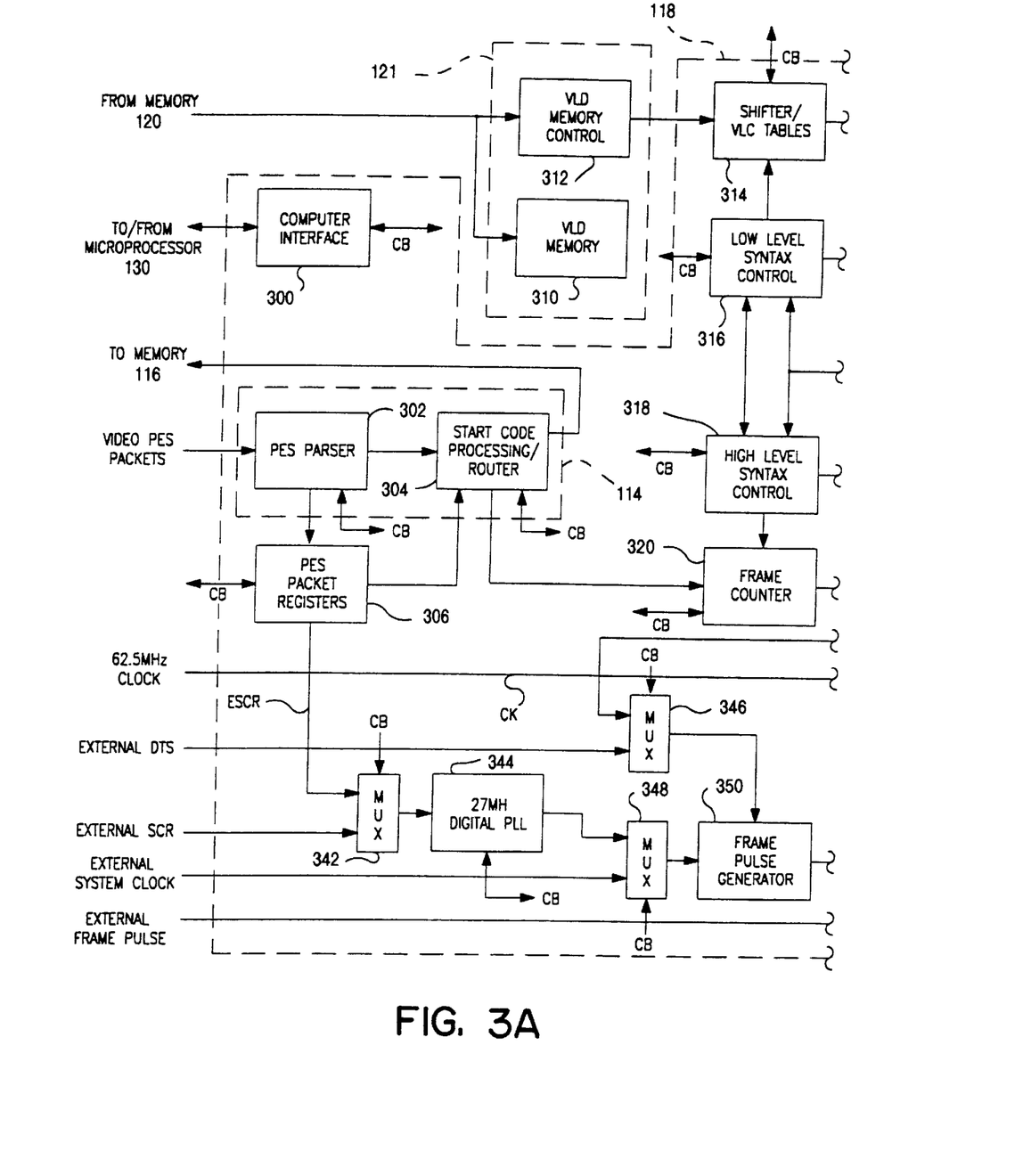
FIG. 3 is a block diagram of a variable length decoder suitable for use in the video decoder shown in FIG. 2.
Figure 3B:
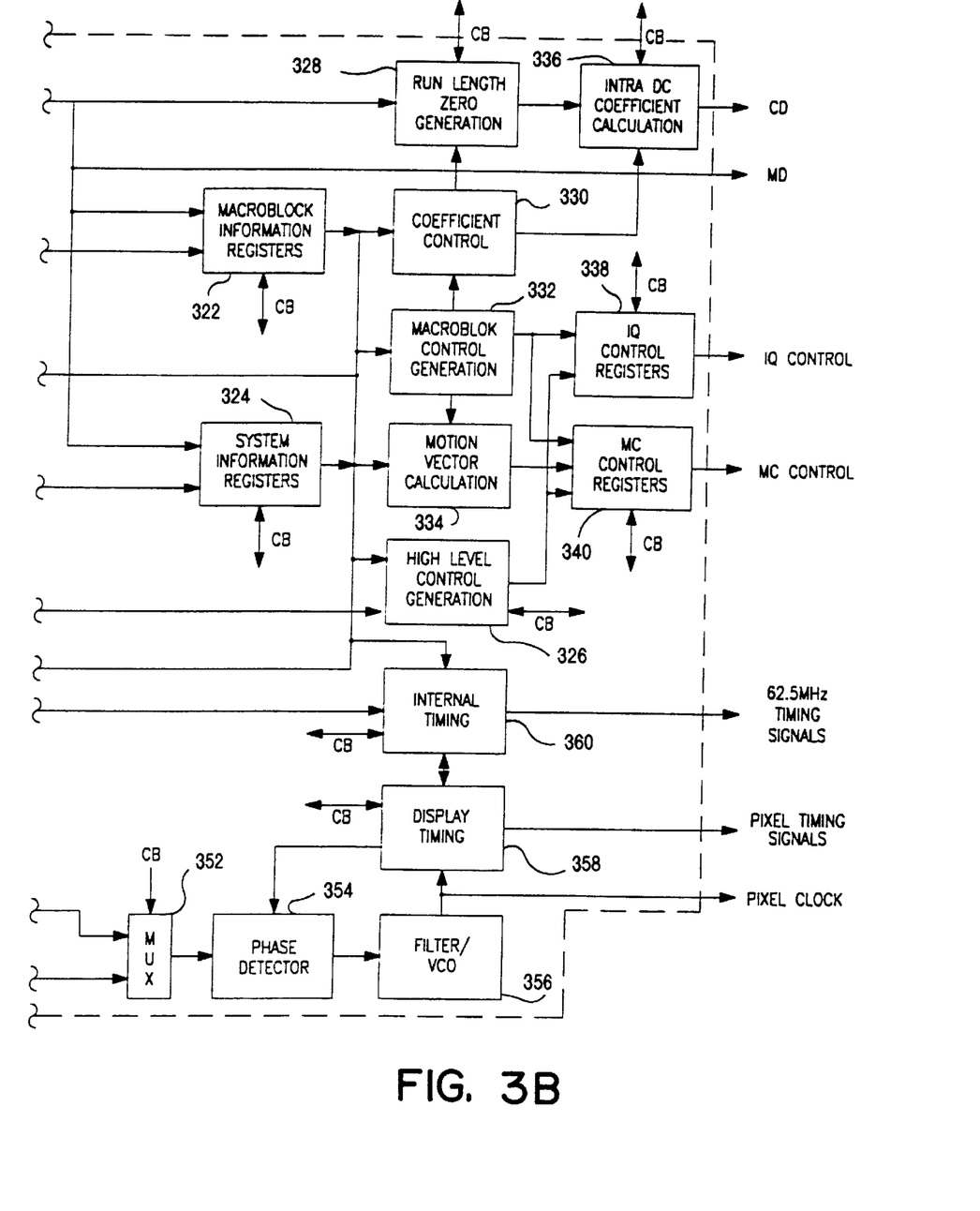

FIG. 3 is a block diagram of the VLD processor 118 and the VLD memory 121. As shown in FIG. 2, a microprocessor 130 is coupled to the decoder. This microprocessor is used to set values in registers which determine the state of the system. In the system shown in FIG. 2, for example, the values provided by the microprocessor 130 may configure the decoder to handle either 525I signals or 525P signals. As shown in FIG. 2, the microprocessor 130 is coupled to a microprocessor interface 112 in the decoder. The VLD processor shown in FIG. 3 also includes a computer interface 300 which is used to link the VLD processor to the microprocessor interface 112. This interface coordinates data transfers between the microprocessor 130 and the various elements of the VLD processor. As shown in FIG. 3, a data transfer bus, CB, connects the computer interface 300 to each of the elements of the VLD processor which may be configured or controlled by the microprocessor 130. The data provided by the microprocessor 130 may, in turn, be provided by an external control function (not shown) or by a transport decoder (not shown) which extracts the control information from the transport layer of the MPEG data stream.

In the processor shown in FIG. 3, the start code processing circuitry 114 receives PES packets at its input port. A PES packet parser 302 internal to the circuitry 114 extracts data from the PES packet headers and reconstructs the bit-stream from the PES packet data. The bit-stream is then passed to start code processing circuitry 304. The circuitry 304 recognizes control data (i.e. start codes) in the bit-stream down to the Picture layer and, based on this data provides frame start information to a frame counter 320. The start code processing circuitry 304 also provides the decoded bit-stream data to the buffer memory 116.

Referring to FIG. 2, bit-stream data in the memory 116 is stored into the memory 120 under control of the DRAM control and address generation circuitry 126. This data is written into an area of the memory 120 which is reserved for use as the VBV buffer. At defined intervals the controller 126 determines if the memory 121 has requested additional bit-stream data. If so, the bit-stream data is read from the memory 120 during those intervals and transferred to the buffer memory 121.

Referring to FIG. 3, as the VLD processor 118 removes bit-stream data from the buffer memory 121, more data is provided via memory access requests to the controller 126.

In the exemplary embodiment of the invention, the memory 121, which buffers the bit-stream data fetched from the memory 120, includes a memory section 310 and a memory control section 312. The memory control section 312 monitors the fullness of the memory 310 and requests additional data from the memory 120, via the controller 126, when sufficient space exists in the memory section 310 to hold the data fetched from the memory 120.

In the exemplary embodiment of the invention, data is stored into and fetched from the memory 120 in units of "rows". A row includes 4,096 (4K) bytes of data. The memory 120 shown in FIG. 2 is actually two memories arranged in parallel. Each of these memories can provide a row of 2,048 (2K) bytes of data in response to a single request. As described below, although both rows are read and written simultaneously, separate addresses may be specified for each of the parallel memories.

In the system shown in FIGS. 1 and 3, the memory 121 may be loaded with as many as three accesses of 4,096 bits each for a total of 12,288 bits of the bit-stream data as soon as sufficient data has been stored in the memory 120 to start the decoder (i.e. as soon as the VBV buffer size criterion has been met). After this initial transfer, data is accessed as it is needed by the memory 121. Thus, the VLD memory 121 may store as much as 4,096 bits of bit-stream data each time that it fetches data from the memory 120. The memory control circuitry 312 in the memory 121, shown in FIG. 3, controls the memory element 310 such that data is provided by the memory 310 of the buffer memory to the decoder 118 as needed.

Referring to FIG. 3, the bit-stream provided from the memory 312 is applied to a shifter 314 which uses various variable length code (VLC) tables to change the variable length coded data from the bit-stream into fixed-length code values. The shifter 314 provides data values to, and receives control information from a low-level syntax control circuit 316 and a high-level syntax control circuit 318. These control circuits monitor the bit-stream syntax to determine which VLC table is to be used to decode the bit-stream data and which data values are to be decoded. The operation of these decoders follows the MPEG-2 video data syntax set forth in the above-referenced draft internal standard. In general, the high level syntax controller 318 governs the operation of the shifter 314 in decoding the Sequence, Group of Pictures and Picture layers while the low level controller 316 governs the shifter in decoding the Slice and Macroblock layers.

The shifter 314 provides fixed-length code values to macroblock information registers 322, system information registers 324 and run-length zero generation circuitry 328. The values provided to the registers 322 and 324 are control values which are extracted from the sequence header, group of pictures header, picture header and slice header. These values are used, for example, to control the decoding of macroblocks of coefficient data, to control the generation of motion vectors and to control the decoding of the inverse quantization matrices. One value which is extracted from the sequence header is the progressive_sequence field of the Sequence_extension field of the sequence header. This value is provided by the system information registers 324 as the signal SCAN TYPE which, is used by the DRAM control and address generation circuitry 126 to configure the memory for decoding progressive scan signals or interlace scan signals, as described below.

The run-length zero generation circuitry 328 expands code values representing groups of zero-valued coefficients into the specified number of zeros. The coefficient control circuitry 330 uses information contained in the macroblock information registers 322, in the system information registers 324 and information provided by the low-level and high-level syntax control circuits to control the operation of the run-length zero generation circuitry 328 and the intra DC coefficient calculation circuitry 336.

Macroblock control generation circuitry 332 extracts and combines data from the macroblock information registers 322 and system information registers 324 at times indicated by the low-level syntax control circuitry 322 to generate information which is used by the coefficient control circuitry 330 in the decoding of the quantized discrete cosine transform (DCT) coefficients. The circuitry 332 also provides information which is used by the motion vector calculation circuitry 334 to regenerate the motion vectors that are used in the portions of the image which are encoded using motion compensated encoding techniques. As described in the above-referenced MPEG-2 Draft Internal Standard, motion vector information is distributed at many layers of the MPEG-2 syntax. Accordingly, the motion vector calculation circuitry 334 also uses data taken directly from the macroblock information registers 322 and system information registers 324 to produce values which are stored in the motion compensation control registers 340.

Other information which is produced by the macroblock control generation circuitry 332 is stored in the inverse quantization control registers 338 and the motion compensation control registers 340. Information to be stored in the registers 338 and 340 is also provided by the high level control generation circuitry 326 which consolidates data from the macroblock information registers 322, system information registers 324 and frame counter 320 at times indicated by the high-level syntax control circuitry 318.

The decoder shown in FIG. 3 provides four output signals containing decoded data: a coefficient data signal, CD; a quantization matrix data signal, MD; an inverse quantization control signal, IQ Control; and a motion compensation control signal MC Control. The signal CD conveys coefficient data while the signals IQ Control and MC Control convey information on the inverse quantization operation and the motion compensation processing, respectively. The signals CD and IQ Control are applied to the IDCT processor 142 and the inverse quantization processor 134, shown in FIG. 2, to aid in the conversion of the coefficient data to corresponding blocks of pixel data. The signal MC Control is applied to the half-pixel and interpolate circuitry 166, as described below, to control the motion compensation processing of any decoded pixel difference data provided by the IDCT circuitry 142.

The decoder shown in FIG. 3 also includes circuitry which generates the system clock signals that are used to decode the MPEG encoded image data. This circuit includes a digital phase-locked loop (DPLL) 344 which is preset to oscillate at a frequency which closely approximates the 27 MHz system clock signal specified in the MPEG-2 standard. This DPLL can be instantaneously synchronized in phase to the system clock signal responsive to one of two system clock references, either the System Clock References (i.e. the SCR values defined in the standard) or the Elementary System Clock Reference (i.e. the ESCR values defined in the standard) provided by a multiplexer 342. Although both of these values may be received in the input data stream, only one set of values is used to synchronize the clock signals. In addition to this instantaneous phase synchronization, the frequency of the DPLL may be changed, responsive to several clock reference values (either SCR or ESCR), to match the frequency of the system clock to that specified in the encoded data stream.

Referring to FIG. 3, the central component in the clock generation circuitry is the 27 MHz DPLL circuit 344. This circuit receives a reference value from a multiplexer 342 which is coupled to receive an externally supplied SCR at one input port and to receive an ESCR, extracted from a PES packet header, at its other input port. The ESCR is provided by the PES packet parser 302, described above, to PES packet registers 306. The ESCR is provided by the registers 306 to the multiplexer 342, as it is received. The SCR and ESCR values are count values of the 27 MHz clock signal. These values are in units of one period of the 27 MHz signal. Each value represents an instant in time at which the encoded SCR or ESCR is received. Responsive to a control signal provided by the microprocessor 130 via the bus CB, the multiplexer 342 applies either the SCR values or the ESCR values to the DPLL 344. The DPLL 344 includes an internal counter (not shown) which is set to the external reference value as part of the synchronization process. The DPLL 344 also uses the difference between the reference value and the internal counter value as a measure of the phase error of the signal produced by the DPLL. This phase error is integrated to produce the control signal which controls the frequency and phase of the signals produced by the DPLL 344.

The VLD processor 118 generates several timing and control signals in addition to the 27 MHz clock signal. The counter value provided by the DPLL 344 is applied to one input port of a multiplexer 348 and an external counter value derived from an external 27 MHz clock signal is applied to another input port of the multiplexer 348. This external 27 MHz clock signal may be derived, for example, by the transport decoder from the transport packets. The multiplexer 348 provides one of these signals as the 27 MHz clock signal to the frame pulse generator 350. The selection of which clock signal to provide is made responsive to the signal CB provided by the microprocessor 130.

The frame pulse generator 350 is also responsive to a decoding time-stamp (DTS) value which may be provided from the transport decoder or from the system information registers 324 and high-level syntax control circuitry 318. When this DTS value matches the counter value provided by the multiplexer 348, the circuitry 350 generates a frame pulse. This pulse is applied to one input port of a multiplexer 352, the other input port of which is coupled to receive an external frame pulse. The multiplexer 352 is controlled by the microprocessor 130 via the control bus CB.

The frame pulse represents the time at which a new image frame is to be decoded and displayed by the HDTV receiver. This pulse is applied to a phase detector of a conventional analog PLL 356 which uses the frame pulse to generate a display pixel clock signal and various other display timing signals such as vertical and horizontal synchronization signals for the display device (not shown). The phase detector 354 compares the externally generated frame pulse to a frame pulse that is generated by counting-down the pixel clock signal. The result is filtered in the loop filter portion (not separately shown) of the filter/VCO 356 and used to control the frequency and phase of its associated VCO (not separately shown) so that the counted-down frame pulse occurs substantially coincident with the pulse provided by the multiplexer 352.

Although not shown, it is contemplated that the logic circuitry 410 of the DPLL 344 may be used to reset the PLL formed by the phase detector 354 and filter/VCO 356 at initial power-on or when it detects a change in the source of the video signal or some other event which may change the pixel clock frequency.

In addition to the pixel clock signal and pixel timing signals, the display timing circuitry 358 exchanges timing information with internal timing circuitry 360. The circuitry 360 generates timing signals which are used to synchronize at least that portion of the circuit which is responsive to the 62.5 MHz clock signal CK. In addition, the circuitry 360 may be used to generate other clock signals, for example, the 50 MHz clock signal used by the inverse quantization and IDCT circuitry 132.

Referring to FIG. 2, the coefficient data stream CD provided by the VLD processor 118 conveys blocks of quantized discrete cosine transform (DCT) coefficients to the memory 128. This memory acts as a first-in-first-out (FIFO) buffer between the VLD processor 118 and the inverse quantization processor 134 and is also used to transform each block of quantized coefficient values provided by the VLD processor 118 into a stream of values representing an inverse zigzag scan of the block. The processor 134 then dequantizes the values. The dequantization operation is described in section 7.4 of the draft internal standard ISO/IEC 13818-2, entitled Generic Coding of Moving Pictures and Associated Audio which is incorporated by reference for its teachings on the decoding of MPEG-2 encoded video signals.

The inverse quantization operation may use a preset quantization matrix which is defined for the MPEG-2 standard or it may use a special quantization matrix which is provided in the sequence header. As defined in the MPEG-2 standard, different quantization matrices may be used for intra-frame encoded data and motion compensated data. In addition, the quantization matrix may be scaled before it is applied to the macroblocks in a slice. This scaling is performed in response to data provided in the slice header which includes the macroblocks. The quantization matrices used by the circuitry 134 are stored in the memory 136.

After the inverse quantization operation, the dequantized coefficient values are applied to the IDCT processor 142 which performs the inverse discrete cosine transform operation. This operation recovers a stream of pixel values or pixel difference values corresponding to the stream which is processed by the inverse quantization circuitry 134. The IDCT processor 142 implements the inverse discrete transform operation described in section 7.5 of the above-reference MPEG-2 standard. In performing this operation, the processor 142 uses the memory 144 as a working storage.

The stream of pixel values or pixel difference values resulting from the IDCT operation are applied to a memory 150. This memory acts as a FIFO buffer and is also used to convert the block scan format into a special macroblock format used by the motion compensation processing circuitry. The macroblocks of pixel values provided by the memory 150 are applied to add and clip circuits 158 and 160. the circuit 158 receives the upper eight lines of each of the 16-line by 16-pixel luminance components of the macroblocks and the upper four lines of each 8-line by 8-pixel chrominance (Cb,Cr) component of the macroblock. The add and clip circuit 160 receives the lower eight lines of the luminance component and the lower four lines of each of the chrominance components of each of the macroblocks. When a 525I signal is being decoded, the samples received by the add and clip circuits 158 and 160 are from respectively different interlaced fields.

As described in the above-referenced MPEG-2 standard, when the macroblocks contain pixel difference values they also include motion vector information. This motion vector information is decoded by the variable length decoders 118 and 122 and is queued for use by the half pixel and interpolation circuitry 166 and the DRAM control and address generation circuitry 126.

The half pixel interpolation circuitry 166 uses motion vector information and motion compensation control information provided by the variable length decoders 118 and 122 to generate pixel values, either directly from the data values held in the memory 120 or interpolated at half-pixel positions between adjacent ones of these data values. The circuitry 166 also performs B-frame interpolation. Each of the four memories labeled 168 is loaded with a 9-line by 17-pixel luminance data block and two 5-line by 9-pixel chrominance data blocks. These blocks are fetched from the memory 120 at locations in the reference frame which are determined from the location, in the current frame, of the block being decoded and its associated motion vector information. Two of the memories 168 are loaded with forward prediction data from the memory 120 whereby one of these two memories 168 is loaded with the upper part of a macroblock and the other is loaded with the lower part of a macroblock. Likewise, the other two memories 168 are loaded with backward prediction data for use in the B-frame interpolation.

The 17 by 9 pixel luminance data block and the 9 by 5 pixel chrominance data blocks for the respective Cb and Cr signals each includes an extra row and extra column of pixels compared to the 8 by 16 luminance half-macroblock and two 4 by 8 Cb and Cr chrominance data blocks with which they are combined by the motion compensation circuitry. The extra line and extra pixel are used to generate data blocks which are shifted in pixel position by one half pixel, horizontally, vertically or diagonally. As an example of the horizontal interpolation, each of the first 16 horizontal pixels is averaged with the next adjacent pixel to create 16 resultant "half-pixels," each representing a pixel position between the two pixel values that were averaged. Input pixel one is averaged with input pixel two to create output pixel one; input pixel two is averaged with input pixel three to create output pixel two and so on until input pixels 16 and 17 are averaged to create output pixel 16. The vertical interpolation proceeds in the same manner by averaging vertically adjacent pixels in the data block. The diagonal half-pixels are produced by combining horizontal interpolation and vertical interpolation.

Responsive to the motion vector information, the half pixel interpolation operations described above generate four complete half-macroblocks of pixel data. Again, responsive to the motion vector data, the B-frame interpolation section of the circuitry 166 may average the forward prediction half-macroblocks with the appropriate pixels from the backward prediction half-macroblocks to create two half-macroblocks.

The half-macroblocks generated by the circuitry 166 are combined with respective half-macroblocks of differential pixel values in the add and clip circuits 158 and 160. These circuits sum nine-bit pixel values, provided by the multiplexers 154 and 156, with eight-bit pixel values, provided by the circuitry 166, to produce an eight-bit result. These pixel values are written into respective buffer memories 162 and 164, from which they are stored into the memory 120 to form frames of decoded image pixel values. In the exemplary embodiment of the invention, the data in the memories 162 and 164 may be transferred one macroblock at a time to the memory 120. As described below, in the exemplary embodiment of the invention, it is assumed that the data is written from the memories 162 and 164 into the main memory 120 one macroblock at a time.

Once the image data is stored in the memory 120 it may be accessed as reference frame data (i.e. anchor frame data) for decoding later-provided differentially encoded image data or it may be accessed to be displayed on a display device (not shown). In the exemplary embodiment of the invention, pixel data representing individual lines of the reproduced image are accessed from the memory 120 for display using a memory 174 and a display controller 175. The display controller 175 is responsive to signals provided by the VLD processors 118 and 122 to access data held in the memory 120 at times indicated by the presentation time stamp values of the picture headers and to reformat the data for display in raster-scan order. As shown in FIG. 2, the memory 174 is responsive to a display clock signal which may be provided from an external display device or may be generated, as described above in the VLD processor 118. In the exemplary embodiment of the invention, the pixel data is not accessed in macroblocks for display. Instead, lines of data from consecutive rows of the memory 120 are accessed. These lines are concatenated to form data representing a line of the displayed image.

Various types of data are stored in the memory 120. In the exemplary embodiment of the invention, the memory 120 holds the MPEG-2 encoded bit-stream, two anchor frames, the frame being decoded and at least a portion of the frame that is being displayed. Even with the wide-bandwidth and concomitant high transfer rate of the RAMBUS memory 120, it is desirable to control the writing into and reading from the memory to ensure that data held in the memory can be fetched from the memory when it is needed and written into the memory as needed, without delay.

As shown in FIG. 2, the memory 120 is divided into two channels, each of which is connected to a respectively different RAMBUS application specific integrated circuit (ASIC) cell (RAC) 172. The RAC's 172, in turn, are coupled to a RAMBUS ASIC cell (RAC) interface 170. The RAC interface 170 provides 128 parallel bits of data to, and receives 128 parallel bits of data from the various elements of the decoder circuit via a single memory port as described above. The bus between the RAC's 172 and the memory 120 is a bidirectional bus having a clock rate of 250 MHz. In the exemplary embodiment of the invention, this memory port is expanded internal to the decoder IC 110 to include separate input and output busses. It is contemplated, however, that a single bidirectional memory bus could be used for the internal memory bus.

Figure 4:
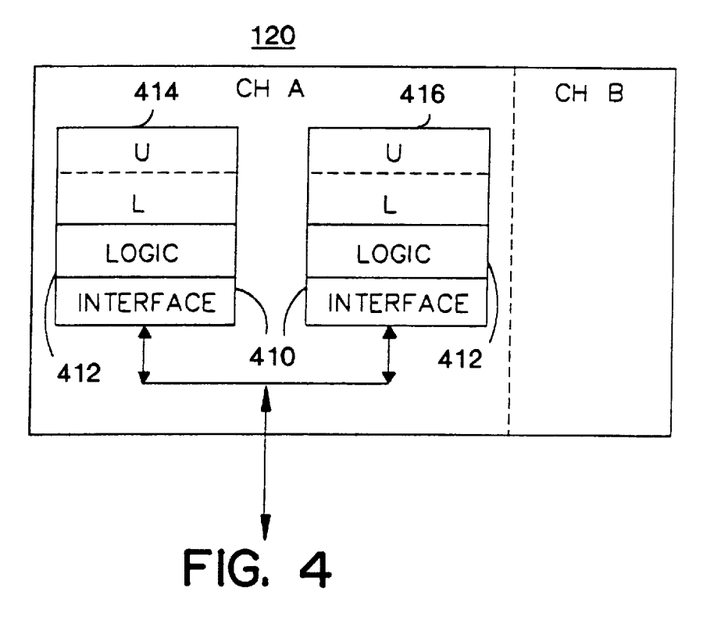
FIG. 4 is block diagram of a high-bandwidth memory suitable for use in the decoders shown in FIGS. 1 and 2.

FIG. 4 is a block diagram which shows the structure of the memory 120 with details of one of the channels (channel A). As shown, each channel (A and B) includes two memory devices, 414 and 416 which hold the actual data. Each memory device, in turn, is divided into two banks, an upper bank (U) and a lower bank (L). The data in each of the channels is arranged in rows and an entire row is accessed at once by logic circuitry 412. A row of data is accessed from a single bank of a single device. As long as data is accessed from the currently addressed row, there is very little penalty for a read or write operation. If, however, data must be accessed from a memory row other than the currently addressed row, there is a delay in accessing the data because the new row must be fetched from the memory.

It is noted that each channel contains four rows with the same row number. These rows are differentiated by which bank of which device is used to access the row of data. The logic circuitry 412 selects the proper device and bank to be used for a particular memory access and provides data to, or receives data from the interface circuitry 410. The interface circuitry mirrors the ASIC cells shown in FIG. 2, according to the protocol defined for transferring data to and from the memory devices 414 and 416. For each channel a memory row includes 2,048 bytes of data. Consequently, for the two channels of the memory 120, a row includes 4,096 bytes of data. The transfer from the interface 410 to the RAC's 172 (shown in FIG. 2) occurs at 250 MHz via the bidirectional memory port with one byte of data being transferred in each channel coincident with each edge of the 250 MHz clock signal. Thus eight bytes (one octbyte) of data are transferred in each period of the 62.5 MHz clock signal.

Figure 5A:
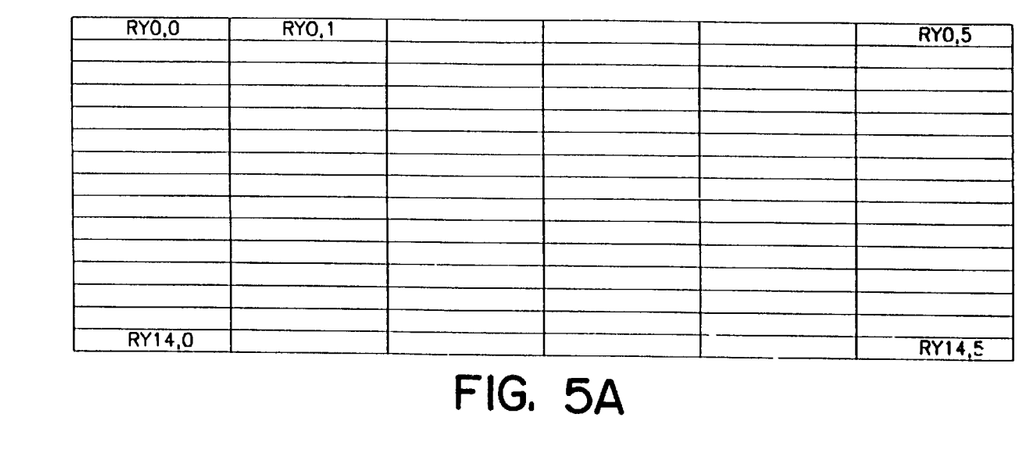
FIGS. 5a and 5b are data structure diagrams which are useful for describing the mapping of an image frame for storage into the memory shown in FIG. 4.
Figure 5B:
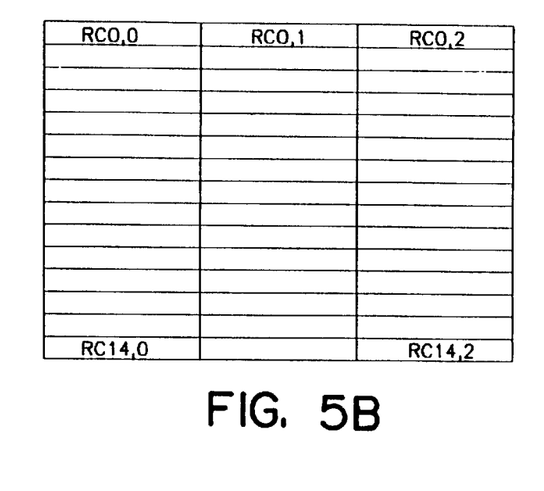

FIGS. 5a and 5b are data structure diagrams which are useful for describing how a frame of image data is stored in the memory 120. FIGS. 5a and 5b show the respective luminance portion and chrominance portion of an image frame of either a 525I or a 525P signal This image field includes 480 lines, each line having 720 pixels. As described above, the rows of data provided by the memory 120 are fixed in length. Each horizontal group of six memory rows shown in FIG. 5a (e.g. $RY_{0,0}$ through $RY_{0,5}$) represents the luminance component of a portion of the image data that is two macroblocks wide and spans the width of the frame. Each group of three horizontal memory rows shown in FIG. 5b (e.g. $RC_{0,0}$ through $RC_{0,2}$) represents the corresponding chrominance component for that portion of the image. Accordingly, a group of macroblocks, that spans the width of the image, uses nine memory rows: six rows to hold the luminance information and three rows to hold the chrominance information.

Figure 6A:
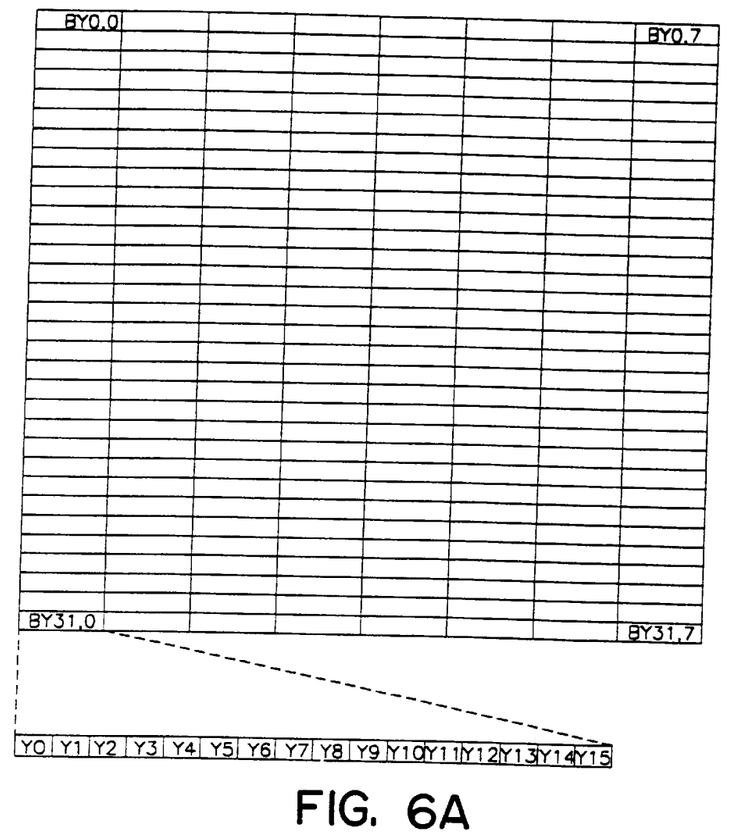
FIGS. 6a and 6b are data structure diagrams which are useful for describing the memory mapping used to store pixel values into the rows of memory shown in FIGS. 5a and 5b.
Figure 6B:
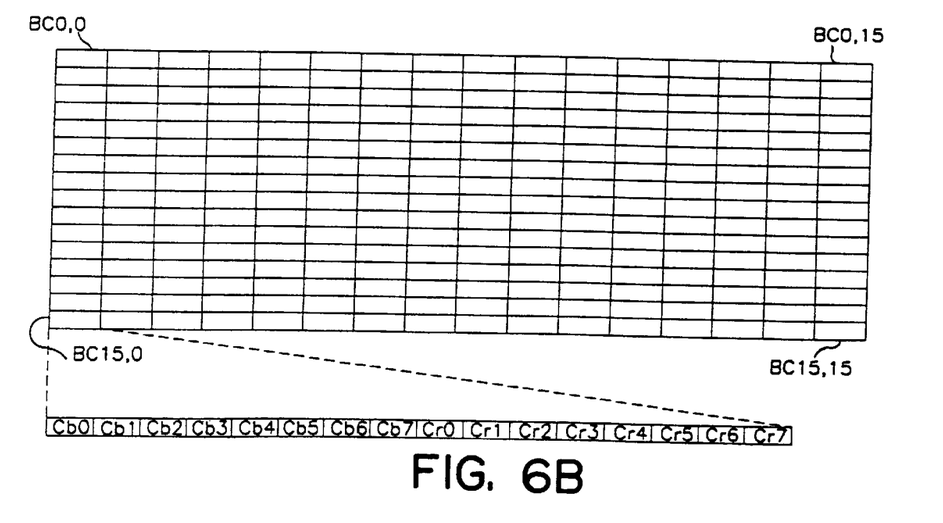

Exemplary memory rows of luminance and chrominance information are shown in FIGS. 6a and 6b. respectively. Each memory row of luminance data, shown in FIG. 6a, is arranged in a matrix of cells having eight vertical columns ($BY_{x,0}$ through $BY_{x,7}$) and 32 horizontal rows ($BY_{0,x}$ through $BY_{31,x}$). Each cell of the matrix represents two octbytes of data, one octbyte from each channel, A and B. An exemplary cell, $BY_{31,0}$ is expanded to illustrate the arrangement of luminance pixel values in the cell. Because each memory row of luminance information includes 128 by 32 bytes, and the frame image is made up of a matrix of six by 15 memory rows, the space allocated for storing an image frame holds 768 by 480 pixels. This is slightly greater than the 720 by 480 pixels which are actually used to reproduce the image.

Each row of chrominance data, as shown in FIG. 6b, includes 4096 of data, arranged in a matrix of cells having sixteen horizontal rows ($BC_{0,x}$ through $BC_{15,x}$), each containing sixteen pairs of octbytes ($BC_{x,0}$ through $BC_{x,15}$). Each pair of octbytes includes one octbyte of the Cb chrominance signal and one octbyte of the Cr chrominance signal, arranged as indicated by the expanded cell $BC_{15,0}$. As shown in FIGS. 5a and 5b, each memory row of chrominance information, for example $RC_{0,0}$ includes the chrominance information for two memory rows of luminance information, for example $RY_{0,0}$ and $RY_{0,1}$. This is in the same proportion as an MPEG-2 macroblock, which includes four 8 line by 8 pixel blocks of luminance information and two 8 line by 8 pixel blocks of corresponding chrominance information, each representing a respectively different one of the color signals Cb and Cr. Thus, each two memory rows of luminance information and one memory row of chrominance information represents 32 macroblocks of image pixels.

Figure 7A:
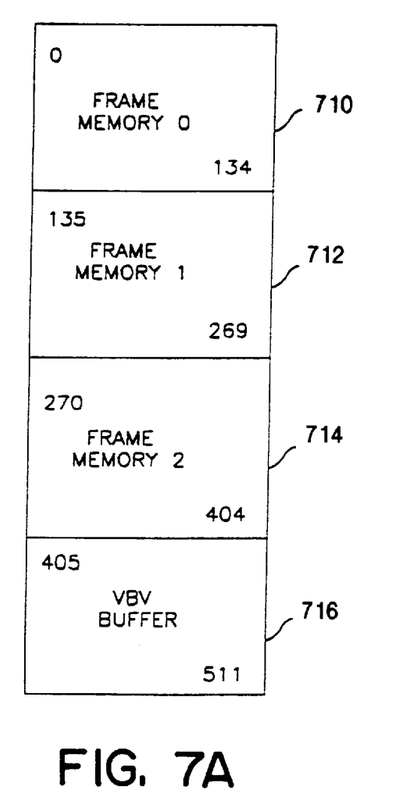
FIGS. 7a and 7b are memory map diagrams which show the configuration of the memory when the decoder shown in FIG. 2 is decoding data in progressive and interlaced formats, respectively.
Figure 7B:
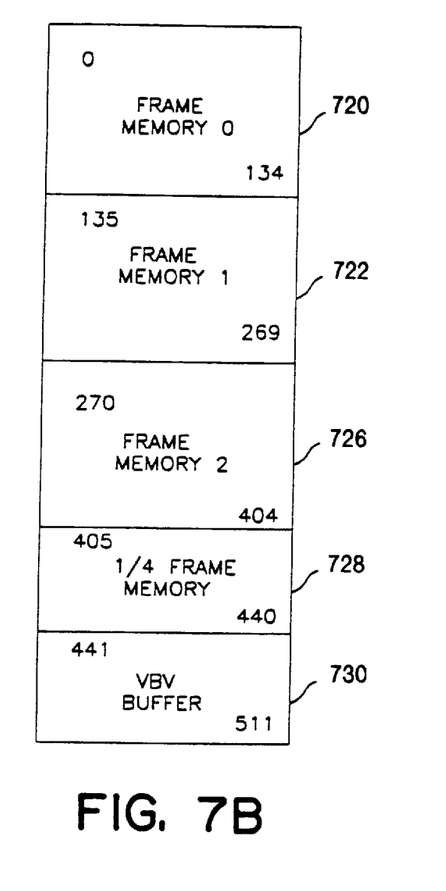

FIGS. 7a and 7b are memory map diagrams which illustrate the layout of data in the memory 120 when 525P and 525I signals, respectively, are being decoded. These diagrams are a graphical representation of data which is resident in the DRAM control and address generation circuitry 126. Responsive to this data, the circuitry 126 routes memory requests from the memory 116; the memories 162 and 164; the memories 168 and the memory 174 to various areas of the memory. This data represents a partitioning of the memory 120 into sections which hold the VBV buffer area, the frame buffers for the anchor frames and the frame buffer for the image which is being decoded. The control circuitry 126 switches between the two configurations shown in FIGS. 7a and 7b responsive to the signal SCAN TYPE provided by the VLD decoder 118. It is noted that the numbers in the corners of the memory areas shown in FIGS. 7a and 7b are the starting and ending addresses of the respective memory areas in units of memory rows.

As shown in FIG. 7a, when a 525P signal is being decoded, the described above, the memory 120 holds three frames of image information, two anchor frames (e.g. 710 and 712) as well as one frame, (e.g. 714) that is being decoded. In addition, the memory 120 holds the VBV buffer 716. Because of the flexibility of image coding allowed by the MPEG-2 standard, an image may not include any B-frames or may include a sequence of B-frames followed by a sequence of P-frames. To properly handle these types of frame sequences, the memory configuration shown in FIG. 7a allows any of the frame buffer areas 710, 712 and 714 to be used to hold an anchor frame or to hold the image which is to be displayed.

For 525P signals, the frame buffer area, 710, 712 or 714, that holds the image that is being decoded is also used for block-to-raster conversion. The block-to-raster conversion operation for a 525P signal is relatively straightforward, the data is accessed from the memory line-by-line for display, as it is stored in the memory. Because the entire frame for a 525P signal is updated 60 times each second, the input rate of the bit-stream for a 525P signal is greater than for a 525I signal. Accordingly, in the 525P decoder, a relatively large VBV buffer is allocated.

FIG. 7b shows the corresponding memory mapping for the system when a 525I signal is being decoded. This memory includes frame buffers areas which hold two anchor frames and a third buffer area, which is larger than either of the frame buffer areas, to hold the image that is being decoded.

As shown in FIG. 7b, the memory 120 is partitioned into a VBV buffer 730, three frame memory buffers, 720, 722 and 726 and a buffer 728 that holds ¼ frame of pixel data. These areas are allocated into the three memory buffer areas described above. When the memories 720 and 722 are used to hold the anchor frames, the memories 726 and 728 are combined to hold the image that is being decoded. The ¼ frame memory area 728, however can be used to increase the size of either of the buffers 720 or 722 as well. Thus, any of these buffers may hold anchor frame data or data for the image that is being decoded. The extra ¼ frame buffer 728, is used in the exemplary embodiment of the invention to simplify the block to raster conversion of B-frames when a 525I signal is being decoded.

The block-to-raster conversion operation for a 525I signal is more complex than for a 525P signal since, for a 525I signal, a frame of data is accessed twice, once for each of the fields that make up the frame. In addition, if a sequence of B-frames are being decoded, the image decoder may be writing new pixel data into the display frame buffer area while the pixel data stored in this frame buffer is being displayed. In order to simplify this procedure, the extra ¼ frame of memory 728 is allocated to display frame buffer 720, 722 or 726 that is used to hold the image that is being decoded.

If, for example, the combination of the buffers 726 and 728 were used as the display buffer, during the first pass through the frame, image data for the first field of the frame is read from the buffer area 726. During the second pass through the frame buffer, to display the second field of the frame, however, the decoded image data for the upper part of the next frame is stored into the buffer 728 while the image data for the second field of the frame is accessed from the buffer 726 for display. When the buffer area 728 has been filled, the system writes the next portion of the image data into the buffer 726, overwriting the image data that was just displayed.

The block to raster conversion which is used, for example, by the set-top box 104 (shown in FIG. 1) to generate an interlaced display from a 525P signal does not require any more memory than a decoder which produces a progressive display from a 525P signal. The conversion from progressive to interlaced is performed by displaying only alternate video lines which are fetched from one of the frame memories 710, 712 or 714 during a given field interval. If, in one field interval, the odd lines are displayed, in the next field interval only the even lines will be displayed. The circuitry (not shown) used to implement this conversion may be readily implemented, for example, in the display controller 175 by one of ordinary skill in the art.

The inventors have determined that, although the data rate of the input bit-stream for a 525P signal is significantly greater than for a 525P signal, it is not so large as to require a VBV buffer having the maximum VBV buffer size specified for a Main Profile, High Level signal. Accordingly when a 525P signal is decoded, a VBV buffer may be used which is approximately twice the size of maximum VBV buffer that may be needed when a 525I signal is being decoded. Accordingly, when a 525P signal is being decoded, ¼ frame of memory 728 is allocated from the frame buffer area to the VBV buffer area. In the exemplary embodiment of the invention, this ¼ frame increases the size of the VBV buffer 716 by approximately 50 percent relative to the VBV buffer 730.

In order to access (fetch or store) one macroblock of data in the memory two memory rows are accessed, one for the luminance data and one for the corresponding chrominance data. The memory 120 is accessed in the same way when macroblocks of data are fetched and stored by the half-pixel interpolator 166 and when pixel data is fetched for display by the display controller 175. When data values are read from the memory 120 for use by the half-pixel interpolator, they are read in units of 9 lines of 17 pixels each for the luminance information and 5 lines of 9 pixels each for the chrominance information. This data is not aligned with the macroblocks as stored in memory from the memories 162 and 164. The data used to generate the reference macroblocks may reside anywhere in memory and may cross memory row boundaries. From this data, the half-pixel interpolator generates a half-macroblock of information which is used to decode predictively encoded data. Each of the memories 168 holds one set of 9 lines by 17 pixels of luminance information and 5 lines by 9 pixels of chrominance information. When the data being decoded has been bidirectionally encoded (B-frame data), the data held in two of the memories 168 represents a complete macroblock from a previous frame while the data held in the other two memories 168 represents a complete macroblock from a subsequent frame in the sequence. When predictively encoded data is decoded (P-frame) only one pair of the memories 168 is used. When intraframe encoded data (I-frame) is decoded the memories 168 are not used.

Two different memories 168 are used to generate one reference macroblock because, in the MPEG-2 standard, a macroblock for an interlaced image includes an upper portion which represents data in one field and a lower portion which represents data in the next successive field. Because of the temporal difference between this data, the data used to generate the respective reference half-macroblocks may not be contiguous in the memory 120. It is noted that the data used to generate the luminance half-macroblocks is 17 pixels wide and the channels A and B can only transfer a total of 16 contiguous values, thus, at least two memory accesses are required to fetch the data which is used to generate each half-macroblock of the luminance signal. The same is true for the chrominance data. The memories 168 use blocks of each of the Cb and Cr signals which are 5 lines by 9 pixels. As the data are arranged in memory, one octbyte of the Cb signal and one octbyte of Cr are transferred by the two channels A and B at any given time. For each 5 line by 9 pixel block that is to be accessed, at least two memory access requests are needed. Accordingly, at least eight memory accesses are used to fetch the reference macroblock data for each of the memories 168, two 9 line by 16 pixel memory accesses (for a total of 9 lines by 32 pixels) for each of the two luminance half-macroblocks and two 5 line by 16 pixel accesses (for a total of 5 lines by 32 pixels) to obtain two 5 line by 16 pixel chrominance information blocks, one for each of the signals Cb and Cr. If the data for the luminance blocks or the chrominance blocks is in the same memory row, very little increased time is required for the eight memory accesses relative to two memory accesses. Because, however, the data blocks which are used to generate the reference macroblocks can occur anywhere in memory, each half macroblock for each of the luminance and chrominance signals may require that as many as four memory rows be accessed. Thus, as many as 16 memory accesses may be required to fetch the data needed to reproduce one reference macroblock.

The general procedure for accessing a memory row uses the following steps, first a memory access request for the addressed row is made by specifying a device, a bank within the device, and a row within the bank as a part of the address. If the device, bank and row portions of this address are the same as the row that was just previously accessed, an acknowledge (ACK) signal is received and data may be transferred. If, however, the requested row is not the same as the last accessed row, then a negative acknowledge (NAK) is received and the memory 120 starts an internal setup operation in the logic circuitry 412 (shown in FIG. 4) which fetches the addressed data from the new row. If, after the setup operation is complete, a second request is presented, it is answered with an ACK and the requested data.

The following table defines the worst case memory access timing for a system according to the present invention. The time interval for these tables is the time required for processing a macroblock of pixel values of either a 525I or 525P signal, that is to say, 1543 cycles of the 62.5 MHz clock signal for a 525I signal and 722 cycles of the clock signal for a 525P signal. This interval is referred to as one macroblock time. For these worst case analyses, it is assumed that four 9 by 17 blocks of luminance (Y) values and four 5 by 9 pairs of blocks of chrominance (Cb,Cr) values are accessed to accomplish the motion compensation processing and that each block requires two memory accesses, which are split across four rows of the memory. As described above, the blocks are accessed as 32 pixels by 9 lines for the luminance information and 32 pixels by 5 lines for the chrominance information. It is also assumed that one macroblock of data is written into the memory 120 from the memories 162 and 164, that 384 pixel values (256 Y pixels and 128 Cb,Cr pixels) are read from the memory for display, and that 4,096 bits of the input bit-stream are read from the memory 120 into the VLD memory 121 or 124 or, alternatively, that 1,024 bits of the bit-stream data are written into the memory 120 from the memory 116, during the macroblock time.

The memory access shown in the table 1 is stated in terms of a macroblock time. it is contemplated, however, that in accordance with the present invention, at least some of the fetch and store operations may occur over longer intervals and may transfer larger amounts of data.

TABLE

| Data | Time | Number of Clocks |
| --- | --- | --- |
| Y reference blocks | 3456 ns | 216 |
| Cb, Cr reference blocks | 2944 ns | 184 |
| Store decoded macroblock | 832 ns | 52 |
| Display 256 pixels, Y, Cb, Cr | 1632 ns | 102 |
| Store/Fetch bit-stream | 1312 ns | 82 |
|  | 10176 ns | 636 |

The Y reference block accesses includes fetching four half-macroblocks, each half-macroblock including one 17 by 9 luminance block. The chrominance reference block accesses include fetching four 9 by 5 chrominance blocks for each of the signals Cb and Cr. The times shown in the table assume that each of the four 17 by 9 luminance blocks and eight 9 by 5 chrominance blocks is spread across four rows of the memory 120.

The only fixed time in the table is the time used to store the decoded pixels of one macroblock. The times to fetch the reference blocks may be less if, for example, the blocks do not cross memory row boundaries, or if no reference blocks are needed, such as when intra-frame encoded data is being processed. The time used to display the decoded pixel values may be zero before an image is ready for display and in blanking intervals between image lines and image fields. Finally, as described above, the bit-stream data is stored and fetched in relatively large blocks at infrequent intervals; the value in the table for this operation represents a worst case. While the refreshing of the memory 120 has not been addressed, it is contemplated that this may be handled, for example, during the blanking portions of the image in place of display memory requests. Accordingly, the refresh timing does not need to be addressed as a separate timing constraint.

While the invention has been described in terms of an exemplary embodiment, it is contemplated that it may be practiced as outlined above within the spirit and scope of the appended claims.

The invention claimed is:

1. Apparatus of decoding a variable length encoded data stream including a plurality of variable length encoded data values representing a plurality of image frames the variable length encoded data values being arranged in sequence records, each sequence record including variable length encoded data values representing a plurality of images, wherein each sequence record of the variable length encoded data stream includes a header and each sequence record represents either an interlaced signal which is to be displayed in interlaced format or a progressive signal which is to be displayed in progressive format, the apparatus comprising:

a memory having a configuration which partitions the memory into sections;

means for receiving the variable length encoded data stream and for storing the variable length encoded data stream into a first one of the sections of the memory;

decoding means including:

means for fetching the variable length encoded data stream from the first section of the memory;

means for processing the fetched variable length encoded data stream to produce first decoded values;

means for processing the sequence headers from the fetched variable length encoded data stream to produce a control signal which indicates whether the first decoded values are to be displayed in progressive format or in interlaced format;

means for fetching reference image data from a second one of the sections of the memory;

means for combining the fetched reference image data with the first decoded values to produce second decoded values which represent the current image; and means for storing the second decoded values in a third one of the sections of the memory;

means for fetching image data from one of the second and third sections of the memory, for display; and memory configuration means, responsive to the control signal, for changing the configuration of the memory between a configuration appropriate for decoding and displaying the interlaced signal and a configuration appropriate for decoding and displaying the progressive signal by changing relative amounts of memory allocated to said first section of the memory and to one of the said second and third sections of the memory, respectively.

2. Apparatus according to claim 1, wherein the memory configuration means adds memory to the first one of the sections of the memory and deletes memory from the third one of the sections of memory when changing the configuration of the memory from the configuration appropriate for decoding and displaying the interlaced signal to the configuration appropriate for decoding and displaying the progressive signal.

3. Apparatus according to claim 2, wherein the memory configuration means adds an amount of memory which holds approximately one-quarter frame of pixel data to the first one of the sections and deletes a corresponding amount of memory from the third one of the sections when changing the configuration of the memory from the configuration appropriate for decoding and displaying the interlaced signal to the configuration appropriate for decoding and displaying the progressive signal.

4. Apparatus according to claim 2, wherein the memory configuration means adds an amount of memory to the first one of the sections which is sufficient to increase the first one of the sections in size by approximately fifty percent and deletes a corresponding amount of memory from the third one of the sections when changing the configuration of the memory from the configuration appropriate for decoding and displaying the interlaced signal to the configuration appropriate for decoding and displaying the progressive signal.

5. Apparatus for decoding a data stream including a plurality of variable length encoded data values representing a plurality of image frames of a video signal, the data stream including a plurality of sequence records, each sequence record having a header and each sequence record containing variable length encoded data values representing either an interlaced signal which is to be displayed in interlaced format or a progressive signal which is to be displayed in progressive format, the apparatus comprising:

a memory, having a configuration which defines a partitioning of the memory into distinct memory areas;

an input circuit which receives the data stream and stores the data stream into a first one of the memory areas;

a decoder which processes the received data stream to produce data representing a decoded image in block format, which processes the sequence headers of the received data stream to generate a scan-type control signal, the scan-type control signal indicating whether the data stream is to be decoded to produce progressive format image data or interlaced format image data, and which stores the decoded image that represents the current image into a second one of the memory areas in block format;

a block to raster converter, which retrieves the decoded image from the memory in block format and which converts the decoded images from block format to raster format; and circuitry which configures the memory to allocate data areas suitable for decoding signals in either the progressive format or the interlaced format, responsive to the scan-type control signal by changing relative amounts of memory allocated to said first and second memory areas, respectively.

6. Apparatus for decoding a data stream including a plurality of variable length encoded data values representing a plurality of image frames, wherein the data stream includes a plurality of sequence records, each sequence record having a header and each sequence record containing variable length encoded data values representing one of an interlaced scan image sequence and a progressive scan image sequence which is to be displayed in interlaced format, the apparatus comprising:

a memory, having a configuration which defines a partitioning of the memory into distinct memory areas;

an input circuit which receives the data stream and stores the data stream into a first one of the memory areas;

a decoder which processes the received data stream to produce data representing a decoded current image in block format, which processes the sequence headers of the received data stream to generate a scan-type control signal, the scan-type control signal indicating whether the data stream represents the interlaced scan image sequence or the progressive scan image sequence, and which stores blocks of the decoded image data, that represent respective portions of the current image, into a second one of the memory areas, as the blocks of decoded image data are produced;

a block to raster converter, which fetches blocks of decoded image data from the second memory area and converts the decoded images from block format to raster format; and circuitry which configures the memory to allocate data areas suitable for decoding signals in either the progressive format or the interlaced format, responsive to the scan-type control signal by changing relative amounts of memory allocated to the first and second memory areas, respectively.

7. The apparatus for decoding the data stream according to claim 5 further comprising:

means for fetching reference image data from a third one of the memory areas; and means for using the fetched reference image data to produce the decoded values.

8. The apparatus for decoding the data stream according to claim 5 wherein each of the decoded values is a fully decoded image pixel value that may be retrieved to display a scene.

9. The apparatus for decoding the data stream according to claim 6 further comprising:

means for fetching reference image data from a third one of the memory areas; and means for using the fetched reference image data to produce the decoded values during a first time interval and for providing the fetched reference image data to the block to raster converter during a second time interval.

10. The apparatus for decoding the data stream according to claim 6 wherein each of the decoded values is a fully decoded image pixel value that may be retrieved to display a scene.

11. Apparatus for decoding a data stream including a plurality of variable length encoded data values representing a plurality of image frames of a video signal, the data stream including a plurality of sequence records, each sequence record having a header and each sequence record containing variable length encoded data values representing one of an interlaced scan image and a progressive scan image which is to be displayed in interlaced format, the apparatus comprising:

memory, having a configuration which defines a partitioning of the memory into distinct memory areas;

an input circuit which receives the data stream and stores the data stream into a first one of the memory areas;

a decoder which processes the received data stream to produce data representing a decoded image in block format, which processes the sequence headers of the received data stream to generate a scan-type control signal the scan-type control signal indicating whether the data stream represents the interlaced scan image or the progressive scan image, and which stores the decoded image data, representing the current image, as the decoded image data is produced, in a second one of the memory areas;

circuitry which configures the memory to allocate data areas suitable for decoding signals in either the progressive format or the interlaced format, responsive to the scan-type control signal by changing relative amounts of memory allocated to the first and second memory areas, respectively; and a block to raster converter, which converts the decoded images from block format to raster format, wherein when the scan-type control signal indicates that the data stream represents a progressive scan image, the block to raster converter fetches blocks of contiguous lines for each frame to be displayed and processes for display, only alternate ones of the lines from each fetched block.

12. The apparatus for decoding the data stream according to claim 1 wherein each of the second decoded values is a fully decoded image pixel value that may be retrieved to display a scene.

* * * * *